United States Patent

Henry-Baudot

[15] 3,699,371

[45] Oct. 17, 1972

[54] SERIES-WAVE WINDINGS FOR DYNAMO-ELECTRIC MACHINES

[72] Inventor: Jacques Henry-Baudot, Antony, France

[73] Assignee: Kollmorgen Corporation, Holyoke, Mass.

[22] Filed: April 7, 1971

[21] Appl. No.: 131,863

[30] Foreign Application Priority Data

April 8, 1970 France..................7012672

[52] U.S. Cl..............................310/207, 310/268
[51] Int. Cl..........................................H02k 3/00
[58] Field of Search............310/268, 207, 185–206

[56] References Cited

UNITED STATES PATENTS 3,480,815  11/1969  Knapp.....................310/268
3,549,928  12/1970  Knapp.....................310/268

Primary Examiner—D. F. Duggan
Attorney—Kemon, Palmer & Estabrook

[57] ABSTRACT

A series-wave winding for a dynamo-electric multipolar machine having at least three pairs of inductor field poles on a face of a magnetic airgap progresses by waves each covering a quadruple polar pitch of the machine.

6 Claims, 3 Drawing Figures

INVENTOR
JACQUES HENRY BAUDOT
Kenyon, Palmer & Estabrook
ATTORNEYS

SERIES-WAVE WINDINGS FOR DYNAMO-ELECTRIC MACHINES

BRIEF SUMMARY OF THE INVENTION

The present invention concerns improvements in or relating to the series-wave windings which are used mainly in the armatures of dynamo-electric machines having a flat annular magnetic airgap and which may also be used in the armatures of dynamo-electric machines having a cylindrical or a planar magnetic airgap.

Series-wave windings are made of successive waves or turns each of which consists of two half-turn conductors which substantially span over two polar pitches so that two half-turn conductors of same orientation are substantially spaced apart by a double polar pitch. Considering illustratively the winding stopped under a multipolar inductor field structure having alternately South and North poles, such a condition may be defined by the statement that a "forward" half-turn segment under a North pole is connected through a "backward" half-turn segment to a further "forward" half-turn segment under the next North pole of the inductor field structure, and so forth. Summarizing, one may say that a series-wave winding develops by waves each of which covers a double polar pitch in the machine.

In the conventional series-wave windings, comprising a number N of half-turn conductors in the circuit for a number p of pairs of inductor field poles on one face of the airgap of the machine and progressing with an overall pitch y, it is known that the value of this progression pitch y is related to the other numbers N and p by the relation:

$$p \cdot y = N \pm 2. \quad \text{(i)}$$

According to the invention, and in contradistinction with $$p \cdot y = 2(N \pm 2) \quad \text{(ii)}$$

provided p be higher than 3.

Otherwise said, a series-wave winding according to the invention develops in waves each of which covers a quadruple polar pitch: two active half-turn conductor segments of same direction of passage of the electrical current, connected together by one active half-turn conductor segment of reverse direction of passage of the electrical current, are under magnetic field inductor poles of same magnetic name spaced in the inductor structure by three other magnetic field inductor poles the intermediate one being of same magnetic denomination as the former ones.

Said embodiments refer to windings for eight inductor pole machines of flat annular magnetic airgap, hence the disc-shaped windings. Of course, the invention is applicable to windings for machines the inductor structure of which comprises any number of pairs of poles higher than three and any kind of magnetic airgap, either annular or cylindrical and/or planar airgap shape.

Figure 1A:
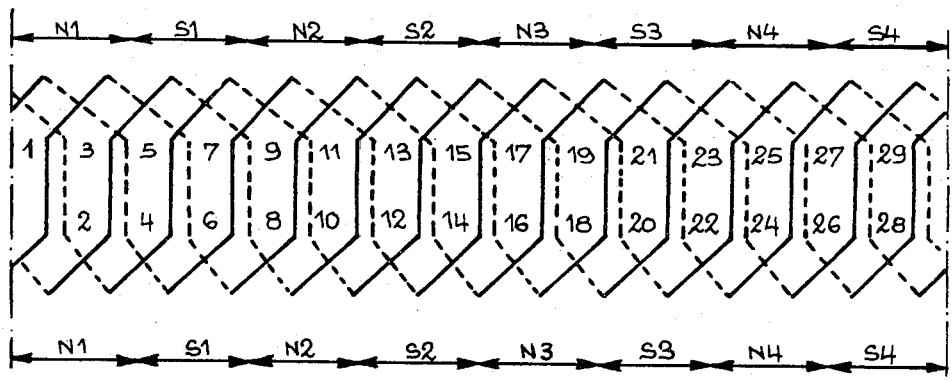
FIG. 1 shows, for comparison purposes, the developed representation (A) of a conventional wave-winding and the developed representation (B) of a series-wave winding according to the invention.
Figure 1B:
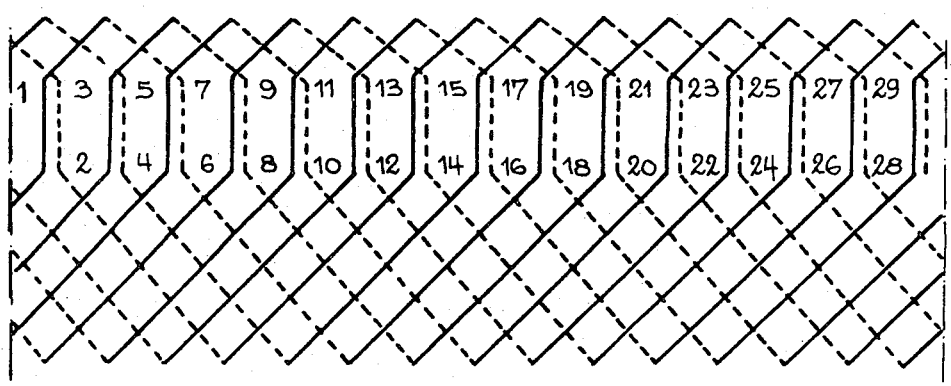

DETAILED DESCRIPTION:

FIG. 1 shows a winding development (A) which is a series-wave winding having thirty conductor segments. The "forward" conductors are numbered with odd numbers, the "backward" conductors are numbered with even numbers. The winding pattern is conventional and consequently, with $N = 30$, $p = 4$, the overall progression pitch y is equal to 8, see relation (i) supra, with for instance a "forward" pitch equal to 5 and a "backward" pitch equal to 3. With the assumption of the winding stopped with respect to the field inductor poles, the conductor No. 1 is under the inductor pole N1 and connected by conductor No. 6 to conductor No. 9 under the field inductor pole N2, said conductor No. 9 being connected by the conductor No. 14 to the conductor No. 17 under the magnetic pole N3, and so forth in accordance with the following chart:

1 – 6 – 9 – 14 – 17 – 22 – 25 – 30 – 3 – 8 – 11 – 16 – 19 – 24 – 27 – 2 – 5 – 10 – 13 – 18 – 21 – 26 – 29 – 4 – 7 – 12 – 15 – 20 – 23 – 28 – 1 .

Part (B) of FIG. 1 shows the corresponding winding pattern designed in accordance to the relation (ii) supra, said pattern being of the type designed by the present invention. The number of conductors is maintained to 30, and so is the number of pairs of poles p maintained to 4. The winding pitch y is made equal to 16 instead of 8, with a forward pitch still equal to 5 but a backward pitch made equal to 11. Conductor No. 1 is connected through conductor No. 6 to conductor No. 17, i.e. the wave passes from pole N1 to pole N3, "jumping" over N2. The winding pattern is as follows:

1 – 6 – 17 – 22 – 3 – 8 – 19 – 24 – 5 – 10 – 21 – 26 – 7 – 12 – 23 – 28 – 9 – 14 – 25 – 30 – 11 – 16 – 27 – 2 – 13 – 18 – 29 – 4 – 15 – 20 – 1 .

The present invention will find its most advantageous application to windings wherein the technique is that of coiling individually insulated, for instance, enameled, thin wire according to the desired pattern, such a manufacturing process having recourse, as known, to programmed winding machines. In such a case, the manufacturing of the winding is highly simplified when the present invention is applied to such windings.

Disc-shaped windings are specially known made of a plurality of layers of turns of a thin electric insulated wire, such windings being mainly used as armatures for commutator controlled rotating dynamo-electric machines. Said windings are made with a winding machine the wire-guide of which travels under the control of a predetermined programme along a series-wave winding path for laying the wire around guiding pins arranged over a rigid surface. It is conventional to provide two concentric sets of such pins plus a third inner set of lesser diameter for establishing in the winding circuit a number of loops which will subsequently serve for making electrical connections of the winding sections as defined by said loops to the blades of a commutator coaxially mounted with respect to the armature winding. The number of pins in the two first sets is equal to the number of half-turn conductors useful for each layer of the series-wave circuit and the number of pins in said inner set is equal to the number of blades of the commutator. After the winding is formed, it may be removed from the carrier and moulded, together with the commutator in preferred embodiments, within a thermosetting material and the winding armature is thus obtained as a self-supporting disc. It may also be maintained on the carrier over which it has been formed and a thermosetting resin may be applied for maintaining the wire turns in rigid relative relation through the multiple layers. If desired, the spool heads of the winding may be submitted to some lamination for reducing the thickness thereof, specially during such moulding operations.

Figure 2:
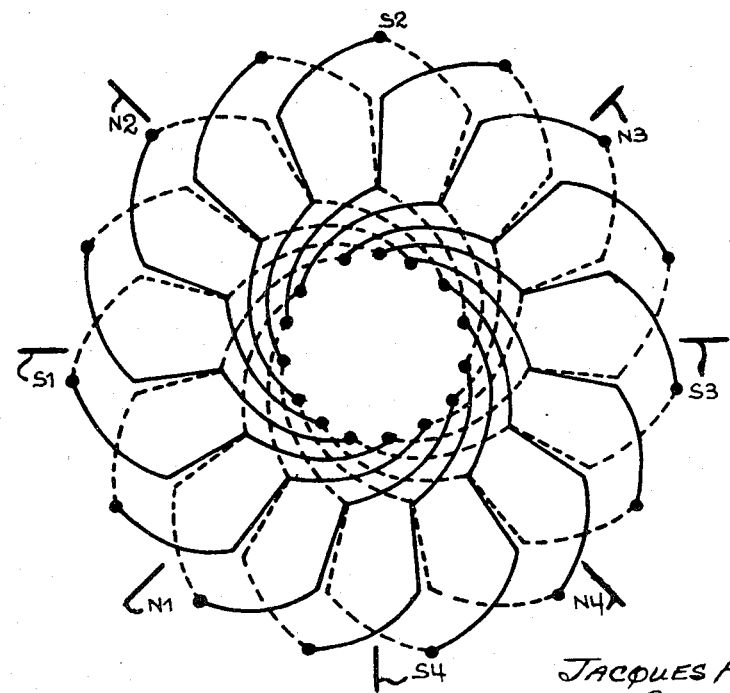
FIG. 2 shows an illustrative embodiment of a series-wave winding according to the invention which is made as a two-layer disc-shaped circuit member; and, FIG. 3 similarly shows another illustrative embodiment of a series-wave winding according to the invention which is made as a multi-layer disc-shaped circuit member.
Figure 3:
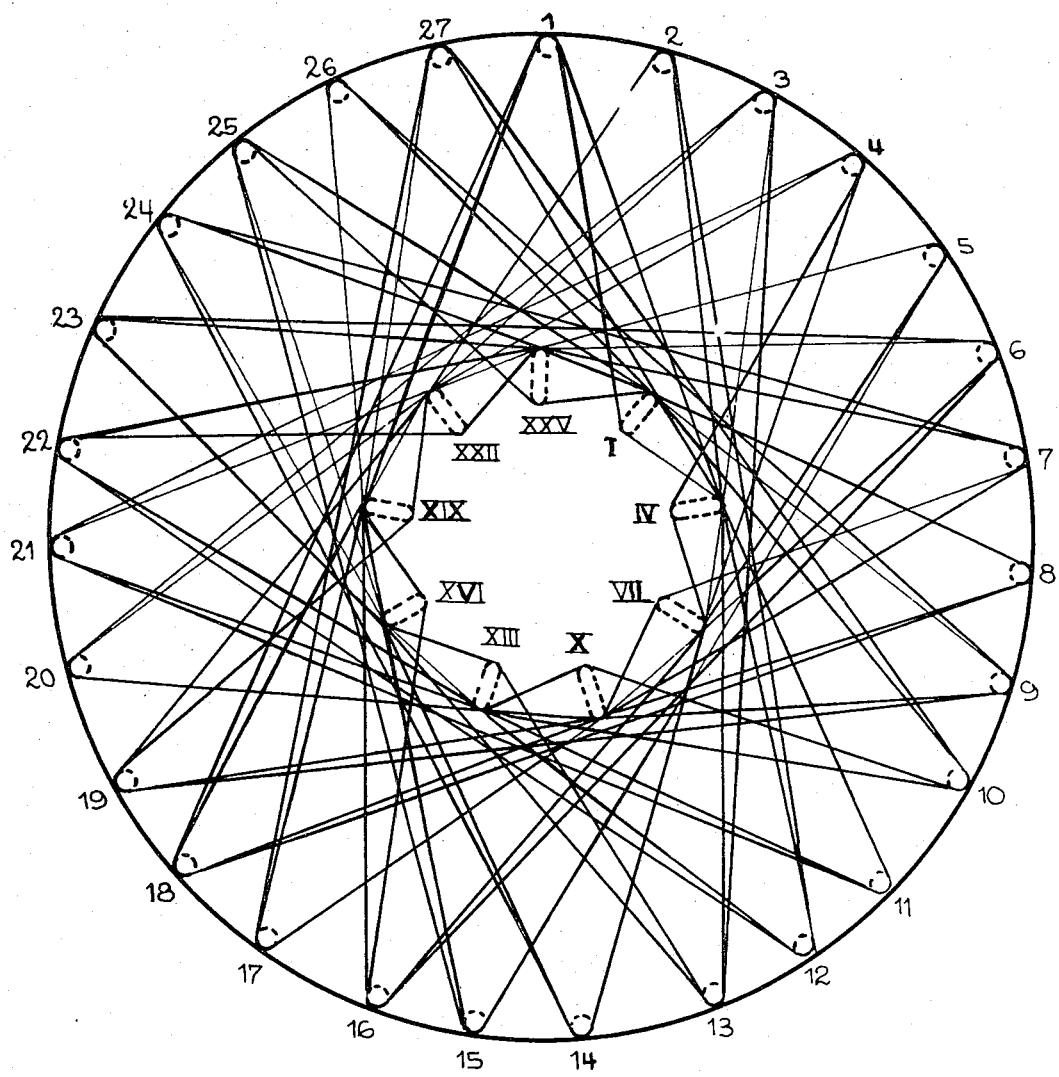

However the necessity of the inner one of the two first sets of guide-pins may unduly limitate or restrict the capabilities of such a manufacturing method and consequently the capabilities of the series-wave windings obtained from such a manufacturing method: as the guide-pins must be of a number equal to twice the number of half-turn conductor segments per layer, and as the conductor segments must pass through the intervals between such pins, the number of pins, hence the number of turns, are restricted to those enabling the passage of the wire turns between the said pins. Application of the invention to such a kind of series-wave winding permits avoiding of such a limitation, whilst obviously simplifying the programme of displacement of the wire-guide. As apparent from FIG. 2, the inner set of guide-pins is omitted and the wire-guide movement will include a lesser number of displacements across the carrier. Only the external set of guide-pins is useful and, of course, for armatures, the most inner set of "commutator loop" guide-pins, because the design of a winding according to the invention enables such a simplified arrangement. Illustratively, FIG. 2 shows an eight polar pitch winding having 27 winding sections and 9 commutator blades, i.e. 9 wire loops for the commutator connections as defined by the pins I, IV, VII, X, XIII, XVI, XXII and XXV. The outer guide-pins are numbered from 1 to 27. The electrical circuit of the winding may be traced as follows:

1 − 26 − 14 − 12 − 2 − 27 − 15 − 13 − 3 − 1 − 16 − 14 − IV, − 4 − 2 − 17 − 15 − 5 − 3 − 18 − 16 − 6 − 4 − 19 − 17 − VII, − 7 − 5 − 20 − 18 − 8 − 6 − 21 − 19 − 9 − 7 − 22 − 20 − X, − 10 − 8 − 23 − 21 − 11 − 9 − 24 − 22 − 12 − 10 − 25 − 23 − XII, − 13 − 11 − 26 − 24 − 14 − 12 − 27 − 25 − 15 − 13 − 1 − 26 − XVI, − 16 − 14 − 2 − 27 − 17 − 15 − 3 − 1 − 18 − 16 − 4 − 2 − XIX, − 19 − 17 − 5 − 3 − 20 − 18 − 6 − 4 − 21 − 19 − 7 − 5 − XXII, − 22 − 20 − 8 − 6 − 23 − 21 − 9 − 7 − 24 − 22 − 10 − 8 − XXV, − 25 − 23 − 11 − 9 − 26 − 24 − 12 − 10 − 27 − 25 − 13 − 11 − I, −1.

It must be understood that in an actual winding of this kind, the number of winding sections and the number of the blades of the commutator will appreciably be higher than those shown in FIG. 2, wherein said numbers have been reduced for the sake of clarity of the drawing.

What is claimed is:

1. Series-wave winding for multipolar dynamo-electric machines having at least three pairs of inductor field poles on one face of the magnetic airgap thereof, wherein the electrical circuit of the winding progresses by waves each covering a quadruple polar pitch.

2. Series-wave winding according to claim 1 wherein the winding is of general discoidal shape and wherein the winding is made of a thin insulated wire in a plurality of overlays with the turns of said wire each comprising a first substantially radial outer portion which substantially spans over one polar pitch and a transverse and substantially linear portion reaching a further radial outer portion, also of one polar pitch span, which is spaced apart angularly from the first by approximately one quadruple polar pitch of the winding.

3. Series-wave winding according to claim 2, wherein part of such turns present inner loops shifted with respect to the winding band defined by the other turns in said winding.

4. Series-wave winding according to claim 2 including a thermosettable resin molded over said overlays of insulated thin wire.

5. Series-wave winding according to claim 4, including an insulating rigid carrier disc supporting said overlays of insulated thin wire and moulding resin.

6. Series-wave winding according to claim 5, wherein said carrier disc includes a plurality of pins defining the spans of the said outer radial portions of the turns.

* * * * *